United States Patent Office 3,084,450
Patented Apr. 9, 1963

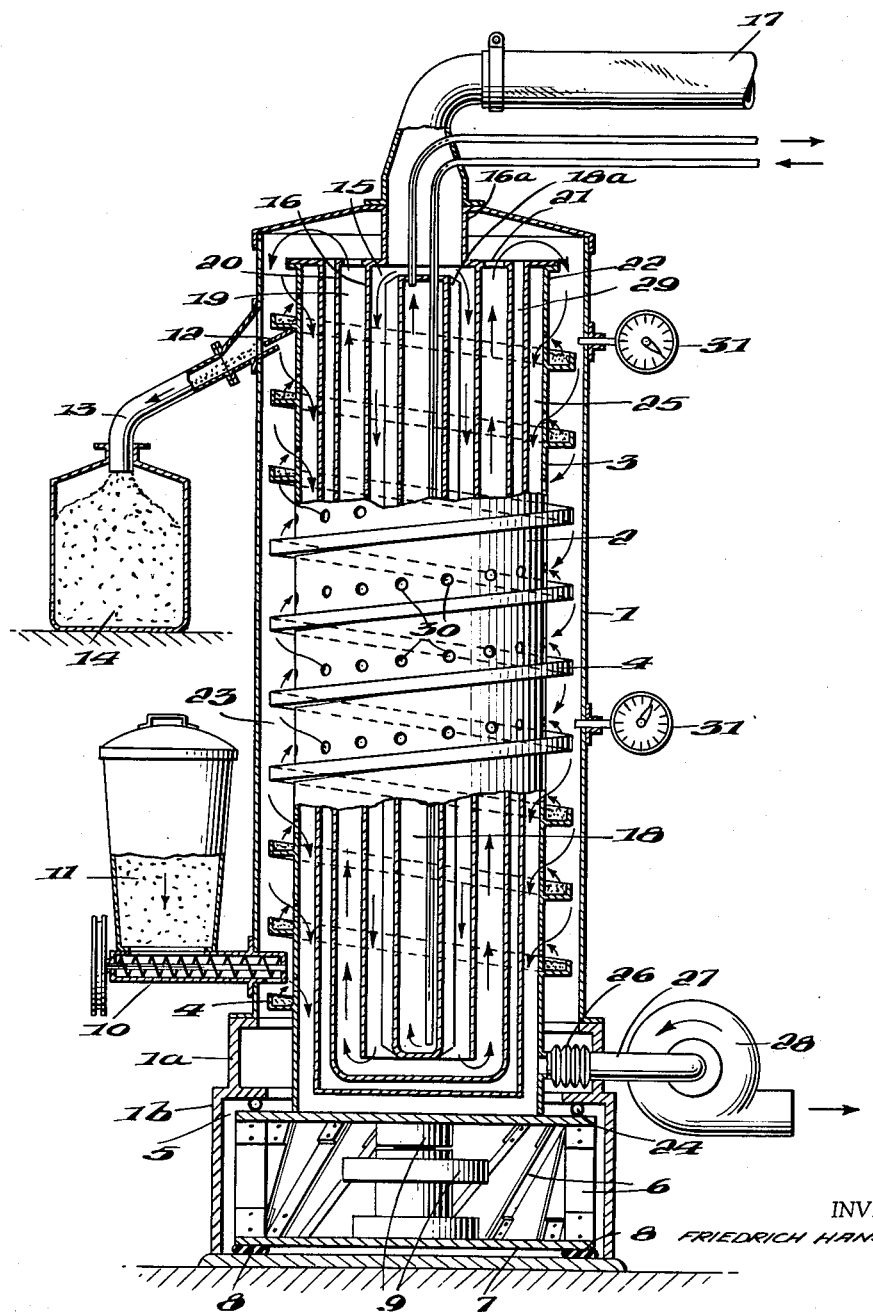

3,084,450
CONTINUOUS DRYING APPARATUS INCLUDING A VIBRATING HELICAL CONVEYOR
Friedrich Hansen, 17 Rue Carteret, Geneva, Switzerland
Filed May 12, 1960, Ser. No. 28,587
Claims priority, application Switzerland May 29, 1959
6 Claims. (Cl. 34—164)

Continuous drying apparatus are auxiliary apparatus which are important for carrying out many physical and chemical processes. These apparatus are essentially constituted by a device for drying the material to be treated and a conveyor device which causes this material to travel through the drying device.

In most of the known continuous drying apparatus, the conveyor device consisted of mechanically driven belt-conveyors or Archimedean screw conveyors or again of rotating layer conveyors or the like.

But such apparatus require a substantial motive power, their volume is relatively large and their operation is expensive.

When the material to be heated, dried and subsequently cooled, is a granular or finely divided chemical material, or the like, it has been proposed to make use, as conveying device, of vibrating helical conveyors the use of which has been found advantageous for a vertical conveying of some materials.

For this purpose, a vibrating helical conveyor was disposed in a casing which was not vibrated, and heating or cooling air was circulated in counter-current fashion through said casing. Such a construction may be satisfactory for heating, drying and cooling some materials which are particularly well adapted for this treatment and when the technical requirements are limited. But it does not permit a serious reduction of the motive power that is required and is not suitable for the treatment of delicate materials to be dried.

The present invention has for its object a continuous drying apparatus the conveying device of which is constituted by a vibrating helical conveyor, this apparatus combining the drying functions of the drying device with the technical possibilities of the vibrating helical conveyor and achieving important advantages concerning the drying process, the consumption of motive power and the volume occupied by the apparatus, owing to the fact that the auxiliary devices, such as the device for heating the gas which is used for drying (for instance drying air) and the collecting chamber for the vapors evolved during the drying operation (hereinafter called "vapors") are disposed on the inside of the conveyor tower concentrically with the walls thereof and that the gas used for drying (serving to transmit heat and to ensure the evacuation of the vapor), which is drawn out by a fan through the drying apparatus, must followed a given path, said path being characterized by the fact that said gas, after it has entered at the center of the conveyor tower and after it has been brought to the desired temperature by the heating elements housed in said conveyor tower, is led through a path as short as possible to the external chamber and flows out from said chamber, while being distributed over the material to be dried which is moving upwardly along its helical path, where said gas mixes with the vapors, through a line of holes provided in the wall of the conveyor tower as to penetrate into the collecting chamber provided on the inside of said conveying tower.

The mixture of gas and vapors is extracted by suction from this collecting chamber and passes through a sleeve of high resiliency which connects the vibrating conveyor tower with a suction fan not subjected to vibrations, and said mixture is then, either evacuated to the atmosphere, or recycled to the drying apparatus after passage through cooling means (not shown on the drawing) in order to recover the solvents.

A preferred embodiment of the present invention will be hereinafter described with reference to the appended drawing given merely by way of example and in which:

The only FIGURE is a diagrammatic vertical sectional view of a drying apparatus according to the invention.

The drying apparatus includes a non vibrating casing or envelope, made of several portions 1, 1a, 1b, and a vibrating helical conveyor 2 housed in this casing.

The construction of vibrating helical conveyors is well known in the art and, in the following description, only the explanations necessary for describing the invention will be given.

The vibrating helical conveyor comprises a conveyor tower 3 consisting of a tube of a diameter ranging from 35 to 50 cm. and of a length ranging from 150 to 300 cm. This tube carries, fixed on the outer wall thereof, a helical gutter 4, inclined at about 12°, which is wound about said tower 3. Tower 3 is fixed rigidly to a bottom plate 5.

Under this bottom plate is mounted the mechanism for producing the vibrations. This mechanism includes driving springs 6 fixed at one end at a suitable angle, to the periphery of bottom plate 5 and at the other end to a fixed plate 7. Between plates 5 and 7 is mounted the electro-magnetic driving device 9 intended to impart to the tower a vibration guided in helical manner by said springs so as to produce the upward displacement of the material contained in helical gutter 4.

The whole of the vibrating structure is supported on resilient cushions 8 disposed in the portion 1b of the casing.

A feed device, such as an Archimedean screw 10, supplies the material to be dried from a hopper 11 to the lower end of helical gutter 4.

The dried material flows out from the upper end of helical gutter 4, at 12, this material being poured into an outlet conduit 13 which does not vibrate, said conduit leading to a fluidtight collecting vessel 14.

According to the present invention, the drying means are mounted on the inside of conveyor tower 3 (whereas, in prior apparatus, this space was left unused). Said means comprise a central heating chamber 15 fixed with respect to casing 1, at the top thereof at 16a, and consisting of a metallic tube 16, said chamber 15 communicating at its upper end with the conduit 17 through which the drying gas is fed and being open at its lower end. In the axis of this heating chamber is mounted, in fixed position therein, a tube 18 with longitudinal fins 18a which constitutes the heating element. This tube is heated to the desired temperature by a stream of hot water or in any other suitable manner. In order to circulate the gas that has flown through heating chamber 15 and to prevent heat losses, a concentric transfer chamber 19 is provided around heating chamber 15. The inner wall of this transfer chamber consists of the metallic tube 16 which surrounds heating chamber 15 and the outer wall of said transfer chamber 19 is a tube 20 made of a material which is a good heat insulator. This tube 20 is closed at the bottom but, due to the fact that tube 16 does not extend to the bottom of tube 20, heating chamber 15 is in communication with transfer chamber 19. Tube 20 is fixed to a supporting cover to which tube 16 is also fixed. Openings 21 provided in said supporting cover enable the drying gas to flow from chamber 19 to the external chamber 23. This chamber is constituted by the space existing between the vibrating conveyor tower 1 and the non vibrating portions 1 and 1a of the casing. The connection between the vibrating helical conveyor and the non vibrating helical conveyor and the non vibrating parts 1a and 1b of the casing is ensured by a rubber tube 24 inflated with air, this air chamber being interposed between the vibrating bottom plate 5 of the conveyor tower and the lower periphery of the non vibrating portion 1a of the casing.

Conveyor tower 3 carries an inner tubular portion 22 which limits an annular chamber 25 which constitutes the collecting chamber according to the invention for the drying gas mixed with the vapors.

In the wall of the conveyor tower there is provided a multiplicity of holes 30 extending along a line parallel to and located above the upper level of the material travelling in the helical gutter 4. Thus the drying gas which circulates above the material travelling in gutter 4 is mixed with the vapors and penetrates into collecting chamber 25 through holes 30. Three sleeves 26 of high resiliency and a non vibrating tube 27 form a communication between collecting chamber 25 and fan 28. The whole of the heating device is carried in a non vibrating manner and is insulated by intermediate chamber 29 from the vibrating helical conveyor.

In order to control the drying temperature, two thermometers 31 are provided to measure the temperature in the immediate vicinity of the material travelling through gutter 4, these thermometers being connected to a thermostatic regulating device.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A continuous drying apparatus which comprises, in combination, a support, a cylindrical tower having a vertical axis, means for movably mounting said tower on said support for helical displacement with respect thereto about said axis, motor means carried by said support and associated with said tower for vibrating said tower with said helical displacement, a conveying gutter carried by said tower and wound helically on the outer wall thereof, means for feeding material to be dried to one end of said gutter, means for collecting dried material from the other end of said gutter, a fixed casing carried by said support and coaxially surrounding said tower, so as to limit therewith an annular space around said tower, heating means mounted in fixed position inside said tower coaxially therewith, means mounted in fixed position inside said tower for circulating a gas along said heating means and delivering said gas, after heating thereof, into said annular space, whereby said heated gas flows in contact with said material in said gutter, means disposed inside said tower coaxially therewith forming a collecting chamber separate from said gas circulating means, said tower being provided with passages to place said collecting chamber in communication with said annular space, whereby said gas mixed with vapors from said material can flow from said annular space into said collecting chamber, and suction means in communication with said collecting chamber for extracting therefrom a mixture of said gas and said vapors.

2. An apparatus according to claim 1 in which said heating means is disposed axially in said tower.

3. An apparatus according to claim 1 in which said heating means is disposed axially in said tower, said gas circulating means forming a first chamber coaxially surrounding said heating means, means for feeding the gas to be heated to said chamber at one end thereof, and a second chamber coaxially surrounding said first chamber so as to connect the other end thereof with said annular space.

4. An apparatus according to claim 1 in which said collecting chamber is adjacent to the inner wall of said tower.

5. A continuous drying apparatus which comprises, in combination, a support, a cylindrical tower having a vertical axis, means for movably mounting said tower on said support for helical displacement with respect thereto about said axis, motor means carried by said support and associated with said tower for vibrating said tower with said helical displacement, a conveying gutter carried by said tower and wound helically on the outer wall thereof, means for feeding material to be dried to one end of said gutter, means for collecting dried material from the other end of said gutter, a fixed casing carried by said support and coaxially surrounding said tower, so as to limit therewith an annular space around said tower, heating means mounted in fixed position inside said tower coaxially therewith, means mounted in fixed position inside said tower for circulating a gas along said heating means and delivering said gas, after heating thereof, into said annular space, whereby said heated gas flows in contact with said material in said gutter, a cylindrical partition carried by said tower coaxially therewith on the inside thereof close to its outer wall so as to limit with said wall a collecting chamber, said tower being provided with holes to place said collecting chamber in communication with said annular space, whereby said gas mixed wtih vapors from said material can flow from said annular space into said collecting chamber, and suction means in communication with said collecting chamber for extracting therefrom a mixture of said gas and said vapors.

6. An apparatus according to claim 5 in which said holes are located along a helical line located just above the upper level of the material to be dried travelling through said gutter.

References Cited in the file of this patent

UNITED STATES PATENTS

| | | |
|---|---|---|
| 2,658,286 | Spurlin | Nov. 10, 1953 |
| 2,688,807 | Ginther | Sept. 14, 1954 |
| 2,805,841 | Kyle | Sept. 10, 1957 |
| 2,847,767 | Carrier | Aug. 19, 1958 |